March 18, 1941. A. RONNING 2,235,043
STEERABLE HAND TRUCK
Original Filed May 21, 1938
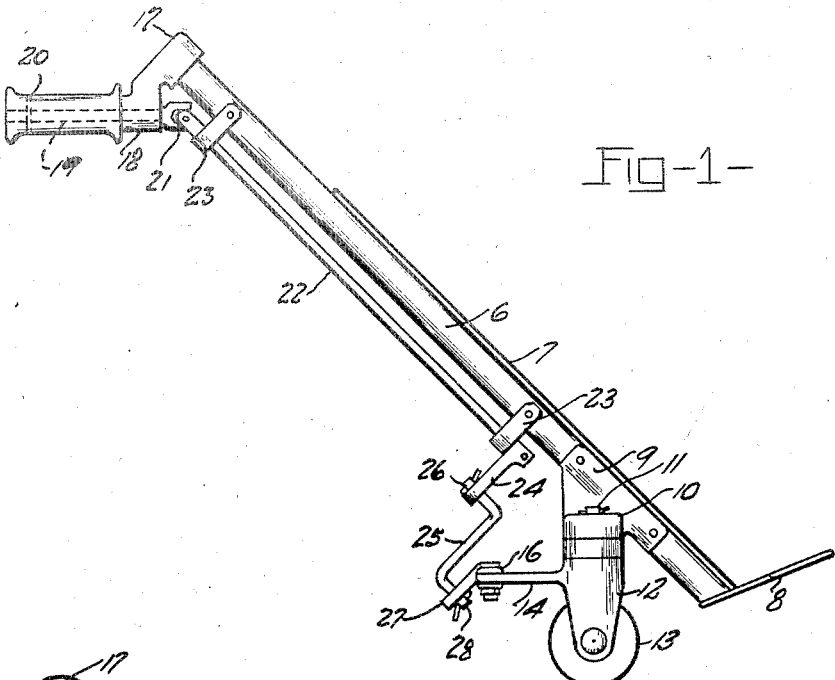
Fig-1-
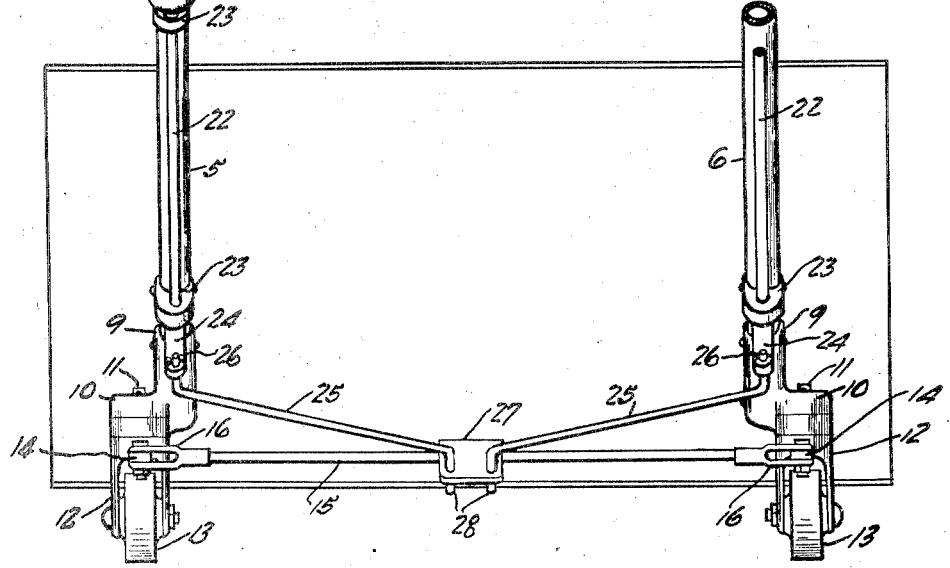
Fig-2-
Inventor
ADOLPH RONNING
By Carlsen & Hazle
Attorneys Patented Mar. 18, 1941

2,235,043

UNITED STATES PATENT OFFICE 2,235,043

STEERABLE HAND TRUCK

Adolph Ronning, Minneapolis, Minn.

Original application May 21, 1938, Serial No. 209,283. Divided and this application March 14, 1940, Serial No. 323,989

8 Claims. (Cl. 280—48)

This invention relates to improvements in hand operated trucks such as used for transporting baggage and such relatively small articles.

These trucks usually comprise a pair of spaced handles across which the back member and foot board or pickup are placed, and which handles are each forwardly provided with a wheel upon which the truck is balanced and transported. These wheels, however, have had no steering action, and to steer the truck it has been necessary to move the rear end bodily from side to side. This action is not always possible or feasible, particularly where space is lacking, and has required an unnecessary number of steps for the operator of the truck.

The primary object of my invention is to provide a truck of this nature but in which the supporting wheels are dirigibly mounted and controlled for steering movements. A further object is to provide a steering mechanism for such trucks in which the supporting handles are provided with movable hand grips which, in addition to serving their usual function of lifting and balancing the truck, also serve to steer the wheels thereof so that the operator will at all times have complete and convenient control over the truck.

These and other more detailed and specific objects will be disclosed in the course of the following specification, reference being had to the accompanying drawing, in which—

Fig. 1 is a side elevation of a truck embodying my invention.

Fig. 2 is a rear end view, one handle having its upper portion broken away.

This application is a division of my copending application for patent on a Manually propelled vehicle, Serial No. 209,283, filed May 21, 1938. Reference to this parent application is invited for comparative purposes.

Referring now more particularly and by reference numerals to the drawing, the truck is seen to comprise a frame or body made up of a pair of laterally arranged frame members 5 and 6 across which is secured a body plate or back 7 and a lower, forwardly turned foot board or pickup 8. Bearing members or castings 9 are secured to the lower forward portions of the members 5 and 6 and have horizontally turned ears 10 apertured on vertical axes to receive the king or pivot pins 11 of the wheel forks 12. The wheels 13 are journaled in the forks 12 and of course may now turn therewith about vertical axes for steering purposes. Crank arms or fingers 14 are rearwardly extended from the forks 12 and are connected by a transversely extended cross rod or tie rod 15, pivotally mounted at its ends 16 to said arms as shown, so that the wheels will move through angling adjustments in unison.

Brackets 17 are secured to the upper rear ends of the frame members 5 and 6 and have depended, apertured bearings 18 in which handle shafts 19 are journaled, the said shafts, rearwardly of the bearings, carrying rigidly mounted hand grips or handles 20. These handles are so disposed that the truck may be lifted and balanced fore and aft upon the wheels 13 to pick up and transport objects in the usual manner, and as clearly shown the truck is usually operated and supported at a forwardly and downwardly sloping angular position.

At forward ends the shafts 19 are connected by universal joints 21 to steering shafts 22 which extend therefrom downwardly in parallelism with the members 5 and 6 and are so supported in brackets or bearings 23 secured to the members at spaced points. The lower forward ends of the steering shafts 22 carry levers 24 rigidly mounted and radially extended therefrom and link rods 25 are pivotally connected at outer ends 26 to the lever. A terminal or connecting plate 27 is secured to a medial point on the tie rod 15 and inner ends of the link rods 25 are pivotally connected thereto as indicated at 28.

In operation the handles 20 may be rotated turning the shafts 19 and through the universal joints 21 transmitting such motion to the steering shafts 22. The resulting swinging movement of the levers 24 reciprocates the link rods 25 endwise and by a similar movement of the tie rod 15 angles the wheels about the axes afforded by the pins 11. The wheels may thus be steered as required to turn the truck toward either side. The handles 20 are of course rotated in the same direction at all times, but with either hand applying the power and the handles at the same time serve their usual function for lifting, pushing and balancing the truck. Obviously, however, operation by only one handle is entirely feasible, in which case one handle would be rigid and one steering shaft and link rod would be omitted. Such variation is considered to lie within the scope of my invention.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hand truck comprising an inclined frame, a pair of transversely spaced wheels mounted for steering movement about generally upright axes at the forward lower end of said frame, load carrying means on the frame in position to normally support the truck load in substantially balanced position on the wheels, handles extending generally horizontally and rearwardly from the rear upper end of the frame whereby an operator by grasping said handles may propel the truck while balancing the load on the wheels, and means operative upon manipulation of the handles to angle the wheels about their said axes to steer the truck.

2. A hand truck comprising an inclined frame, a pair of transversely spaced wheels mounted for steering movement about generally upright axes at the forward lower end of said frame, load carrying means on the frame in position to normally support the truck load in substantially balanced position on the wheels, handles extending generally horizontally and rearwardly from the rear upper end of the frame whereby an operator by grasping said handles may propel the truck while balancing the load on the wheels, and means operative upon manipulation of at least one of the handles to steer the wheels about said axes.

3. A hand truck comprising a normally inclined frame, a pair of wheels supporting the forward lower end of the frame and mounted for angling movement to steer the truck, means for supporting the truck load on the frame in substantially balanced position over the wheels, substantially horizontal handles extending rearwardly from the upper rear end of the frame for supporting and propelling the truck, one of said handles being oscillatable about its longitudinal axis, and means operative by oscillation of the handle for angling the wheels to steer the truck.

4. A hand propelled vehicle comprising a frame supported forwardly by a pair of wheels mounted for steering movements about upright axes, the said frame having upwardly and rearwardly extending side members, a pair of rearwardly extending handles and oscillatably mounted on the said side members, steering shafts connected at rear ends to the handles for oscillation thereby, and means connecting the forward ends of the steering shafts to the wheels for steering the wheels by the oscillation of the said handles.

5. A hand propelled vehicle comprising a frame, wheel forks pivotally mounted on vertical axes at the forward end of the frame, wheels mounted in the forks, arms extending from the forks, handles journaled at the rear of the frame for oscillation about their axes, steering members rotatably supported by the frame and connected at rear ends to the handles for oscillation thereby, and means connecting the forward ends of the steering members to the said arms for steering the wheels by oscillation of the handles.

6. A hand propelled vehicle comprising a frame, wheel forks pivotally mounted on vertical axes at the forward end of the frame, wheels mounted in the forks, arms extending from the forks, a tie rod pivotally connected between the arms, handles rearwardly extended from the frame and rotatably supported for oscillation about their axes, steering members rotatably supported on the frame and connected at rear ends to the handles for oscillation thereby, levers mounted on forward ends of the steering members, and link rods pivotally connected at their ends between the said levers and the tie rod for steering the wheels in response to oscillation of the handles.

7. A hand propelled vehicle comprising a frame forwardly supported by a pair of wheels mounted for steering movements about upright axes, the said frame being operated in an upwardly and rearwardly inclined position, handles extending substantially horizontally from the upper rear end of the frame for supporting and propelling the same, steering members rotatably supported on the frame and sloping downwardly from forward ends of the handles to points adjacent the wheels, universal joints connecting the handles to the steering members, and means connecting lower forward ends of the steering members to the wheels for steering the same in response to oscillation of the handles.

8. A hand propelled vehicle comprising a pair of laterally arranged frame members, bearing members at forward ends of the members, supporting wheels mounted on the bearing members for steering movements about upright axes, bearing members at the rear ends of the frame members, handles journaled on the rear bearing members for oscillation about their axes, brackets secured on the frame members, steering shafts rotatably supported in the said brackets along the frame members and connected at rear ends to the handles, and means connecting the forward ends of the steering shafts to the wheels for steering the wheels in response to oscillation of the said handles.

ADOLPH RONNING.